(12) United States Patent
Carroll

(10) Patent No.: US 11,872,463 B2
(45) Date of Patent: Jan. 16, 2024

(54) NETWORK-ENABLED SIGNALING DEVICE SYSTEM FOR SPORTING EVENTS

(71) Applicant: TRI HoldCo, Inc., Folsom, CA (US)

(72) Inventor: Derek Carroll, Folsom, CA (US)

(73) Assignee: TRI HOLDCO, INC., Folsom, CA (US)

( * ) Notice: Subject to any disclaimer, the term of this patent is extended or adjusted under 35 U.S.C. 154(b) by 121 days.

(21) Appl. No.: 17/331,179

(22) Filed: May 26, 2021

(65) Prior Publication Data

US 2022/0379189 A1 Dec. 1, 2022

(51) Int. Cl.
| | |
|---|---|
| H04L 12/24 | (2006.01) |
| H04L 41/0803 | (2022.01) |
| A63B 71/06 | (2006.01) |
| G10K 5/00 | (2006.01) |
| H04W 4/38 | (2018.01) |
| H04L 67/12 | (2022.01) |
| H04L 51/214 | (2022.01) |
| H04W 4/80 | (2018.01) |

(52) U.S. Cl.
CPC ............ *A63B 71/06* (2013.01); *G10K 5/00* (2013.01); *H04L 51/214* (2022.05); *H04L 67/12* (2013.01); *H04W 4/38* (2018.02); *A63B 2225/20* (2013.01); *A63B 2225/50* (2013.01); *H04W 4/80* (2018.02)

(58) Field of Classification Search
CPC . A63B 71/06; A63B 2225/20; A63B 2225/50; G10K 5/00; H04L 51/214; H04L 67/12; H04W 4/38; H04W 4/80

USPC .......................................................... 700/91
See application file for complete search history.

(56) References Cited

U.S. PATENT DOCUMENTS

| | | |
|---|---|---|
| 5,065,251 A | 11/1991 | Shuhart |
| 5,293,354 A | 3/1994 | Costabile |
| 5,507,246 A | 4/1996 | Rand, Jr. |
| 5,847,652 A | 12/1998 | Yamamoto |
| 6,067,013 A | 5/2000 | Pejic |
| 6,181,236 B1 | 1/2001 | Schneider, Jr. |
| 6,369,697 B1 | 4/2002 | Poole |
| 6,603,711 B2 | 8/2003 | Calace |
| 6,794,989 B2 | 9/2004 | Naegely |
| 7,561,494 B2 | 7/2009 | Stern |
| 7,987,809 B2 | 8/2011 | Uribe |
| 8,786,416 B2 * | 7/2014 | Saguin ..................... G07C 1/22 368/10 |
| 9,396,628 B1 | 7/2016 | D'angelo |

(Continued)

*Primary Examiner* — Ario Etienne
*Assistant Examiner* — Elizabeth Kassa
(74) *Attorney, Agent, or Firm* — Inventive Law Inc.; Jim H. Salter

(57) ABSTRACT

A system and method for providing network-enabled signaling devices for sporting events are disclosed. An example embodiment is configured for: detecting an event at a sporting activity by use of a signal generator with a data processor and a sensor subsystem, the event detection being triggered by a sensor of the sensor subsystem detecting a signal exceeding a pre-defined threshold; generating a signal message including information indicative of the event detection; establishing, by use of the data processor of the signal generator, a connection with a data network; sending the signal message to a message broker via the data network; and causing the message broker to forward the signal message to subscribed subscriber platforms.

20 Claims, 12 Drawing Sheets

(56) References Cited

U.S. PATENT DOCUMENTS

| | | | |
|---|---|---|---|
| 9,502,018 B2 | 11/2016 | Cronin | |
| 10,143,888 B2* | 12/2018 | Andrews | H04W 4/02 |
| 10,235,847 B2* | 3/2019 | Inglot | G09B 19/0038 |
| 10,951,957 B2 | 3/2021 | Hall | |
| 2005/0162257 A1 | 7/2005 | Gonzalez | |
| 2006/0109089 A1 | 5/2006 | Boehm | |
| 2010/0102938 A1* | 4/2010 | Delia | H04W 72/0453 |
| | | | 340/326 |
| 2011/0173235 A1* | 7/2011 | Aman | G06V 40/23 |
| | | | 707/E17.055 |
| 2012/0002509 A1* | 1/2012 | Saguin | G08C 23/02 |
| | | | 368/3 |
| 2013/0235702 A1 | 9/2013 | Saguin | |
| 2014/0056432 A1* | 2/2014 | Loui | G10L 25/51 |
| | | | 381/56 |
| 2015/0124568 A1* | 5/2015 | Royer | G08C 17/02 |
| | | | 368/113 |
| 2015/0142169 A1* | 5/2015 | Kim | A47L 11/4083 |
| | | | 15/98 |
| 2015/0297949 A1* | 10/2015 | Aman | G06T 7/246 |
| | | | 348/157 |
| 2016/0012810 A1* | 1/2016 | Cronin | G08B 7/00 |
| | | | 340/323 R |
| 2016/0135655 A1* | 5/2016 | Ahn | G05D 1/0044 |
| | | | 15/319 |
| 2016/0259341 A1* | 9/2016 | High | G05D 1/0027 |
| 2018/0074508 A1* | 3/2018 | Kleiner | A47L 9/2852 |
| 2018/0214743 A1* | 8/2018 | Andrews | H04W 4/02 |
| 2018/0214760 A1 | 8/2018 | Andrews | |
| 2018/0263449 A1* | 9/2018 | Rosskopf | A47L 9/2852 |
| 2018/0365939 A1* | 12/2018 | Inglot | G08B 5/36 |
| 2019/0045207 A1* | 2/2019 | Chen | G06F 21/44 |
| 2020/0187150 A1* | 6/2020 | Eisner | H04W 76/50 |
| 2022/0111253 A1* | 4/2022 | Dahlstedt | G01S 13/89 |

* cited by examiner (Whistle or Signal Generator)

1 Microcontroller / Radio
2 Microphone
3 Vibration
4 Pressure
5 Temperature
6 Humidity
7 Barometric Pressure
8 Gyroscope
9 Magnetometer
10 Accelerometer
11 Photo resistor
12 LED
13 Speaker (Whistle or Signal Generator)

(Whistle or Signal Generator)

(Penalty Flag or Signal Generator)

(Turnover Beanbag or Signal Generator)

(Booth Official Device or Signal Generator)

(Player Helmet or Signal Generator)

Processing Logic for a Network-Enabled Signaling Device System For Sporting Events
-2000-

Detect an event at a sporting activity by use of a signal generator with a data processor and a sensor subsystem, the event detection being triggered by a sensor of the sensor subsystem detecting a signal exceeding a pre-defined threshold.
-2010-

Generate a signal message including information indicative of the event detection.
-2020-

Establish, by use of the data processor of the signal generator, a connection with a data network.
-2030-

Send the signal message to a message broker via the data network.
-2040-

Cause the message broker to forward the signal message to subscribed subscriber platforms.
-2050-

End

Fig. 12

NETWORK-ENABLED SIGNALING DEVICE SYSTEM FOR SPORTING EVENTS

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2020-2021 TRI Holdco, Inc., All Rights Reserved.

TECHNICAL FIELD

This patent application relates to network-enabled signaling systems, according to one embodiment, and more specifically to a system and method for providing network-enabled signaling devices for sporting events.

BACKGROUND

In many sports such as football, soccer, basketball, ice hockey, wrestling, etc., an official blows a whistle to notify players and spectators of the occurrence of some event. Because of increased crowd noise, it is often impossible for live spectators at a stadium and television viewers at home to discern the audible signal and to know when the event occurred. For example, in the sport of American football, when a referee signals that a play has ended, the audible signal from a whistle usually cannot be heard by the crowd in attendance or by the television audience. If the ball is subsequently fumbled, it is difficult to know whether the whistle was blown before or after the fumble. The inability to hear the referee's whistle can also cause errors in the game clock. Moreover, coaches and players on the field and coaching staff, officials, or journalists in the booth or press box can be confused if a referee's signal is missed or delayed.

In some conventional solutions, a standard whistle is used to initiate a wireless signal simultaneous with, and in the same manner as, the traditionally used audible signal. By means of a receiver, this wireless signal is used to initiate a variety of visual signals that can be discerned by both live spectators and television viewers. However, the conventional solutions typically use air pressure or buttons in the whistle to initiate the wireless signal. These mechanical solutions can be subject to failures. Additionally, the wireless signal is usually direct-linked to a limited quantity of devices configured to perform some specific action (e.g., activate a light) when a signal is received. As a result, the conventional solutions lack configurability, versatility, and convenience.

SUMMARY

In various example embodiments described herein, a system and method for providing network-enabled signaling devices for sporting events are disclosed. In the example embodiments, a network-enabled signaling device is integrated with an event signaling system and configured to receive a signal from an official at a sporting event (e.g., the blowing of a referee's whistle) and to publish the activation of the signal to a plurality of network-connected subscribers. In various example embodiments, the subscribers can be people using their network-connected computers or network-connected devices. The disclosed event signaling system provides a set of hardware elements and software processes to facilitate conveyance of the sports official's signals to the appropriate and authorized set of subscribers for action in response to the official's signals. Various example embodiments of the event signaling system are described in detail below.

BRIEF DESCRIPTION OF THE DRAWINGS

The various embodiments are illustrated by way of example, and not by way of limitation, in the figures of the accompanying drawings in which:

FIG. 12 illustrates a processing flow diagram that illustrates an example embodiment of a method as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for providing network-enabled signaling devices for sporting events are disclosed. In the example embodiments, a network-enabled signaling device is integrated with an event signaling system and configured to receive a signal from an official at a sporting event (e.g., the blowing of a referee's whistle) and to publish the activation of the signal to a plurality of network-connected subscribers. In various example embodiments, the subscribers can be people using their network-connected computers or network-connected devices. The disclosed event signaling system provides a set of hardware elements and software processes to facilitate conveyance of the sports official's signals to the appropriate and authorized set of subscribers for action in response to the official's signals.

As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system. Various example embodiments of the event signaling system are illustrated in the accompanying drawings and described in detail below.

Figure 1:
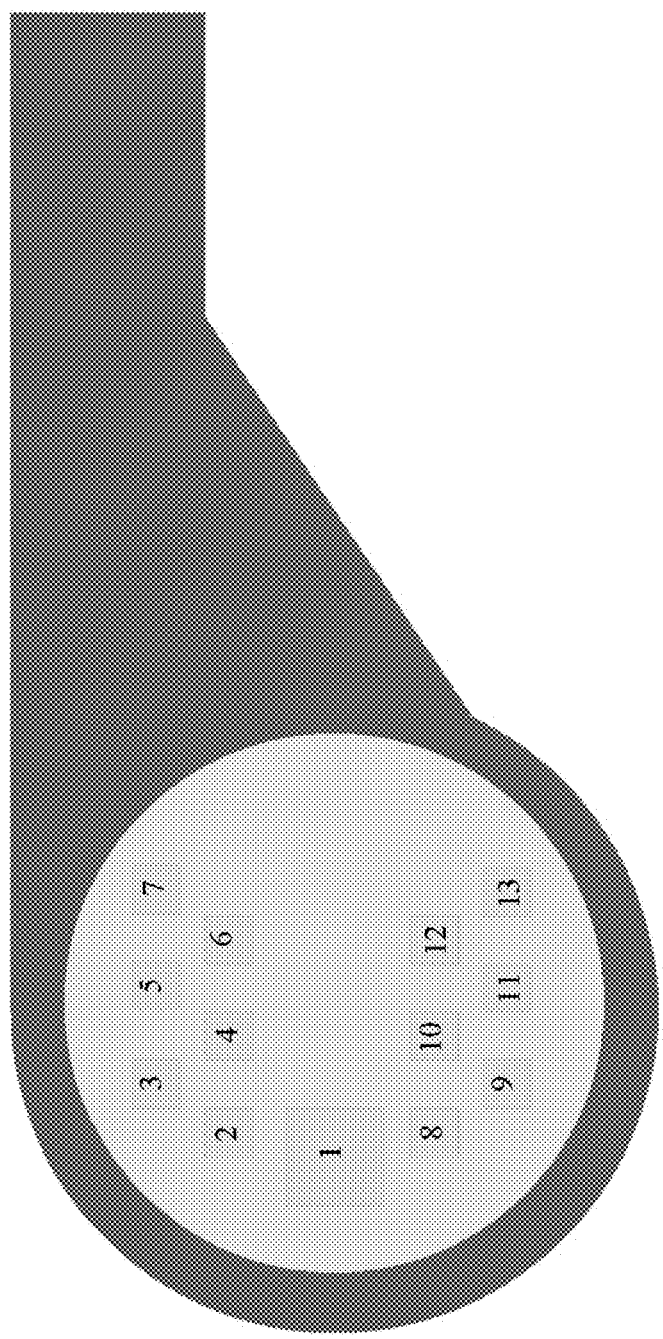
FIG. 1 illustrates a profile view of an example embodiment of a whistle or signal generator, which may be used in the event signaling system as described herein.
Figure 2:
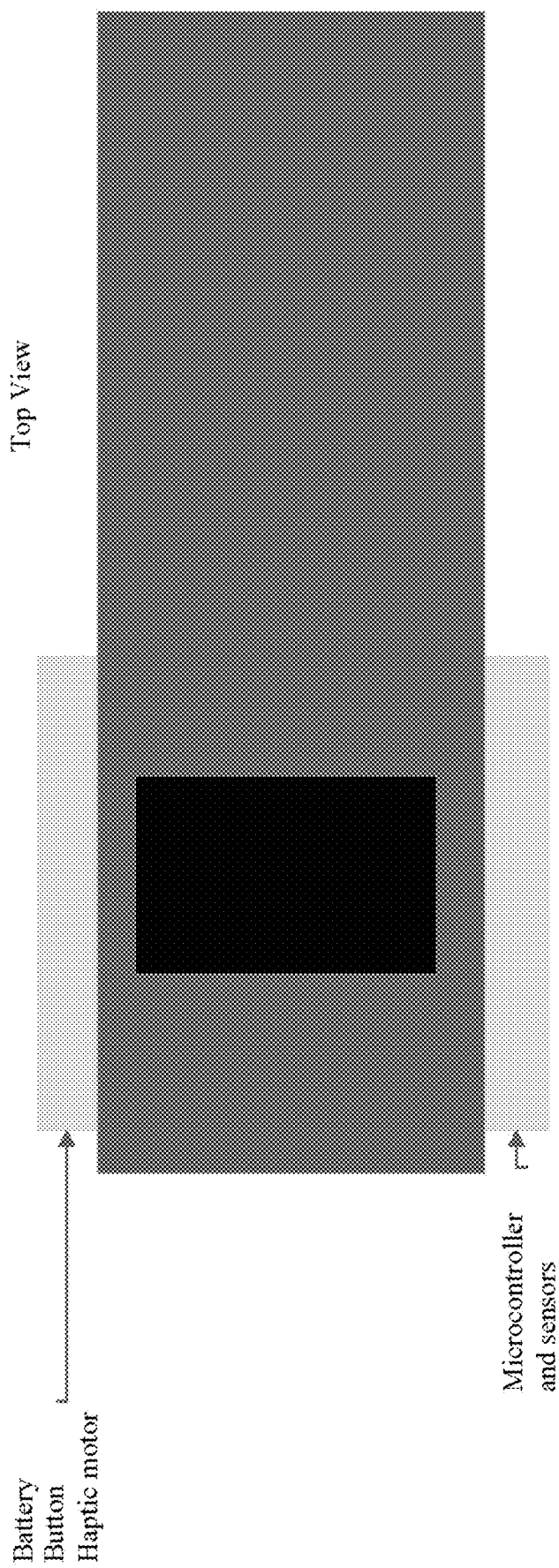
FIG. 2 illustrates a top view of an example embodiment of a whistle or signal generator, which may be used in the event signaling system as described herein.
Figure 3:
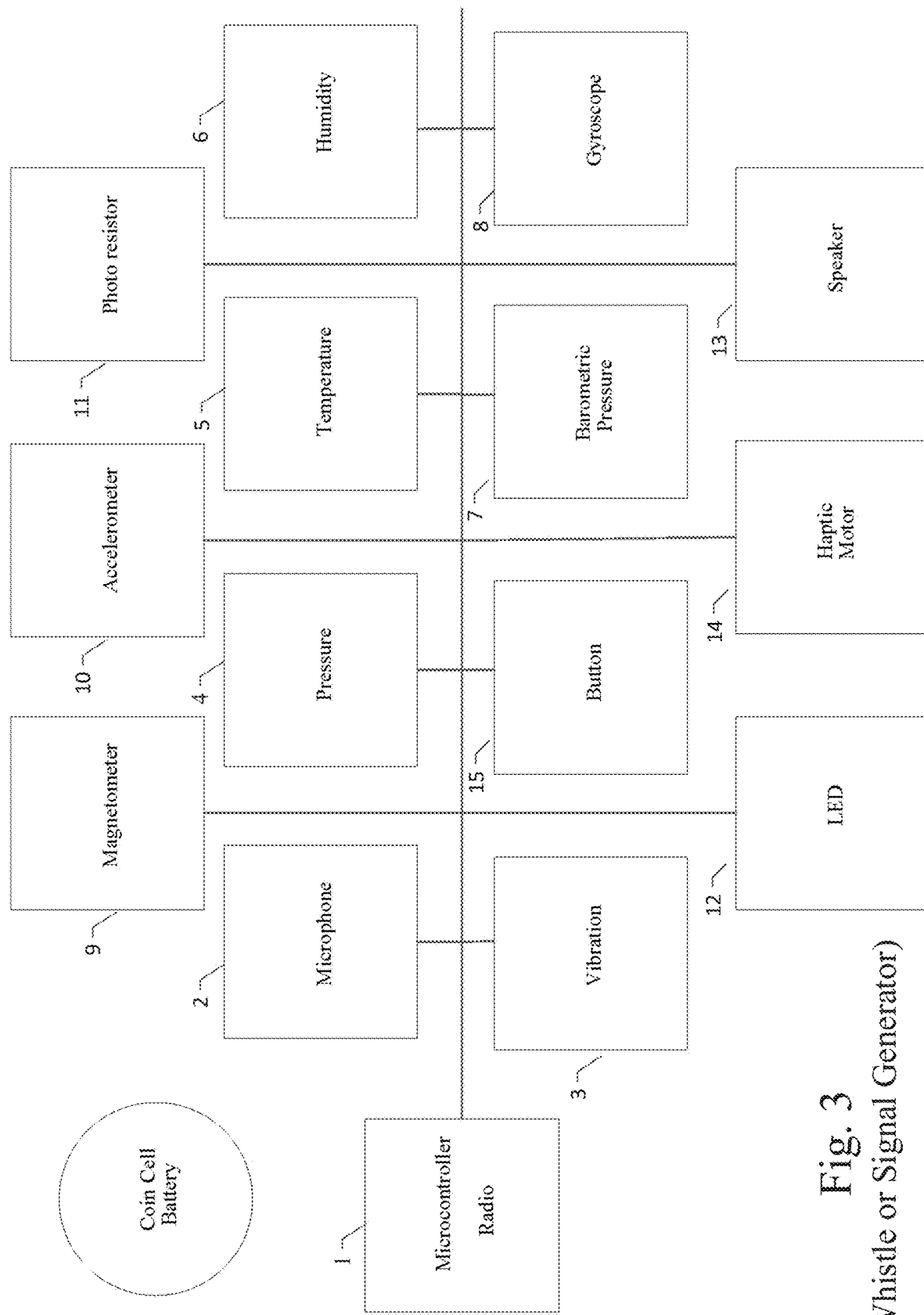
FIG. 3 illustrates a schematic of an example embodiment of the devices or subsystems provided in a whistle or signal generator, which may be used in the event signaling system as described herein.

FIG. 1 illustrates a profile view of an example embodiment of a whistle or signal generator, which may be used in the event signaling system as described herein. FIG. 2 illustrates a top view of the example embodiment of the whistle or signal generator, which may be used in the event signaling system as described herein. FIG. 3 illustrates a schematic of an example embodiment of the devices or subsystems provided in a whistle or signal generator, which may be used in the event signaling system as described herein. As well-known to those of ordinary skill in the art, standard whistles are used by officials at a sporting activity (e.g., football, soccer, basketball, ice hockey, wrestling, etc.) to signal an event occurring at or within the sports activity. Such standard whistles can include Fox 40™ pea-less whistles used by sports associations, such as the NBA, NCAA, NFL, CFL, NHL, Olympics, and World Cup. These, and other whistles, make loud sounds when air is blown into a mouthpiece.

As shown in FIGS. 1 through 3 as one example of a signal generation device or signal generator of an example embodiment, a standard whistle can be augmented or replaced with an improved whistle having several new subsystems including: 1) a microcontroller or data processor, 2) a wireless radio transceiver, 3) a set of sensors, and 4) a set of local alert or output devices. These signal generator subsystems are described in more detail below.

The microcontroller 1 subsystem can include, for example, an MBIENT Labs™ MetaMotionC microcontroller to manage input and output from the wireless radio transceiver, the set of sensors, the set of local alert or output devices, and a data network interface. It will be apparent to those of ordinary skill in the art in view of the disclosure herein that other equivalent types of microcontrollers or data processors can be similarly used. In the example embodiment, the microcontroller 1 can include a wireless radio transceiver, such as a Bluetooth™ Low Energy (BLE) wireless radio transceiver. The microcontroller 1 can include General Purpose Input/Output (GPIO) expansion ports for adding one or more sensors to the sensor subsystem managed by the microcontroller 1. The microcontroller 1 can be battery powered with a coin cell-type battery. Microcontroller 1 can loop analog read and stream data to a network gateway as described in more detail below. The microcontroller 1 subsystem can include on-board memory for the storage of operational firmware. The operational firmware can be installed or updated via the BLE wireless radio transceiver.

The signal generator of an example embodiment can include a sensor subsystem having one or more of the specific types of sensors described below. For example, the sensor subsystem can include a microphone 2 to monitor for the sound of the whistle. The microcontroller 1 can use the microphone 2 to determine if an audible sound sourced from the whistle of a sufficient volume and duration has occurred. The detection of such a sound from the whistle can indicate the signaling of an event, such as a signal from a sporting official.

In example embodiments, the sensor subsystem of the signal generator of an example embodiment can include a vibration sensor 3 to monitor the signal generator for acoustic vibration. The microcontroller 1 can use the vibration sensor 3 to determine if an acoustic vibration sourced from the whistle of a sufficient volume and duration has occurred. The detection of such an acoustic vibration from the whistle can indicate the signaling of an event, such as a signal from a sporting official.

In example embodiments, the sensor subsystem of the signal generator of an example embodiment can include a pressure sensor 4 with a diaphragm to monitor the signal generator for changes in air pressure, such as when a whistle is blown. The microcontroller 1 can use the pressure sensor 4 to determine if a change in air pressure sourced from the whistle of a sufficient volume and duration has occurred. The detection of such a change in air pressure from the whistle can indicate the signaling of an event, such as a signal from a sporting official.

In example embodiments, the sensor subsystem of the signal generator of an example embodiment can include a manual button 15 or switch with which an official can manually signal the occurrence of an event by manually pressing the button 15 or switch. In an example embodiment, a sporting official can also use the manual button 15 or switch to as method to override ready for play status checks.

In example embodiments, the sensor subsystem of the signal generator of an example embodiment can include a temperature sensor or thermometer 5. The microcontroller 1 can use the temperature sensor 5 to obtain temperature information relative to the environment in which the signal generator is currently located. The temperature information can be useful to determine a current state of the environment in which a sporting activity is occurring. In some cases, certain subscribers to the information from the signal generator of an example embodiment can use this information for particular purposes.

In example embodiments, the sensor subsystem of the signal generator of an example embodiment can include a humidity sensor or hygrometer 6. The microcontroller 1 can use the humidity sensor 6 to obtain humidity information relative to the environment in which the signal generator is currently located. The humidity information can be useful to determine a current state of the environment in which a sporting activity is occurring. In some cases, certain subscribers to the information from the signal generator of an example embodiment can use this information for particular purposes.

In example embodiments, the sensor subsystem of the signal generator of an example embodiment can include a barometric pressure sensor 7. The microcontroller 1 can use the barometric pressure sensor 7 to obtain atmospheric pressure information relative to the environment in which the signal generator is currently located. The atmospheric pressure information can be useful to determine a current state of the environment in which a sporting activity is occurring. In some cases, certain subscribers to the information from the signal generator of an example embodiment can use this information for particular purposes. Additionally, microcontroller 1 can use the data from the barometric pressure sensor 7 to determine a location, height, or altitude of the signal generator relative to ground level or sea level. The microcontroller 1 can use this information to determine if the signal generator has been raised or lowered by a sporting official using the signal generator. For example, the raising or lowering of the signal generator can indicate that the sporting official is ready (or not ready) for the sporting activity to commence.

In example embodiments, the sensor subsystem of the signal generator of an example embodiment can include a gyroscope 8. The microcontroller 1 can use the gyroscope 8 to obtain orientation information relative to the signal generator and the environment in which the signal generator is currently located. For example, the microcontroller 1 can determine the physical orientation of the signal generator, such as vertical indicating the whistle is hanging from a lanyard around the official's neck, or horizontal indicating the signal generator is located in the official's mouth and ready for play. The orientation information can be useful to determine a current state of the signal generator and the environment in which a sporting activity is occurring. In some cases, certain subscribers to the information from the signal generator of an example embodiment can use this information for particular purposes. Additionally, microcontroller 1 can use the data from the gyroscope 8 to determine an orientation of the signal generator relative to ground level. The microcontroller 1 can use this information to determine if the signal generator has been moved by a sporting official using the signal generator. For example, the movement of the signal generator can indicate that the sporting official is ready (or not ready) for the sporting activity to commence.

In example embodiments, the sensor subsystem of the signal generator of an example embodiment can include a magnetometer or compass 9. The magnetometer 9 can measure the strength and direction of the earth's magnetic field and communicate the x, y, and z components to the microcontroller 1. The microcontroller 1 can use the magnetometer 9 to obtain orientation and direction information relative to the signal generator and the environment in which the signal generator is currently located. For example, the microcontroller 1 can determine the physical orientation and direction of the signal generator, such as a direction the signal generator is facing when the whistle is blown by a sporting official. The orientation and direction information can be useful to determine a current state of the signal generator and the environment in which a sporting activity is occurring. In some cases, certain subscribers to the information from the signal generator of an example embodiment can use this information for particular purposes.

In example embodiments, the sensor subsystem of the signal generator of an example embodiment can include an accelerometer 10. The microcontroller 1 can use the accelerometer 10 to obtain speed and acceleration information relative to the signal generator and the environment in which the signal generator is currently located. For example, the microcontroller 1 can determine a speed and acceleration of the signal generator, such when the whistle is dropped or when an official has fallen. The speed and acceleration information can be useful to determine a current state of the signal generator and the environment in which a sporting activity is occurring. In some cases, certain subscribers to the information from the signal generator of an example embodiment can use this information for particular purposes.

In example embodiments, the sensor subsystem of the signal generator of an example embodiment can include a photoresistor or light-dependent resistor (LDR) 11. The microcontroller 1 can use the photoresistor 11 to obtain ambient light level information relative to the environment in which the signal generator is currently located. For example, the microcontroller 1 can determine if the whistle is currently stored in box, pocket, or otherwise not ready for play. The microcontroller 1 can use the photoresistor 11 to determine if the signal generator is currently exposed to light to thereby pause or deactivate the whistle if it is not. The ambient light level information can be useful to determine a current state of the signal generator and the environment in which a sporting activity is occurring. In some cases, certain subscribers to the information from the signal generator of an example embodiment can use this information for particular purposes.

In an example embodiment, the microcontroller 1 of a signal generator can use the output from a plurality of sensors of the sensor array to determine whether or not to send an event signal message to network-connected subscribers. For example, the microcontroller 1 can be configured to signal an event only if both the microphone 2 and the vibration sensor 3 detect a signal concurrently.

The signal generator of an example embodiment can include a local alert subsystem having set of local alert or output devices configured to alert or notify the user of the signal generator of a status or to convey information to the user of the signal generator. In an example embodiment, the local alert subsystem can include one or more of the specific types of output devices described below. For example, the local alert subsystem can include one or more light-emitting diodes (LEDs) 12 configured to display different colors of lights, such as red, green, blue, yellow, and white. These LEDs 12 can be used by the microcontroller 1 to provide various status indications to the user of the signal generator. Each color, or combinations of colors, can represent different status conditions.

In example embodiments, the local alert subsystem of the signal generator of an example embodiment can include a haptic motor 14 to cause physical vibration of the signal generator. The haptic motor 14 can be used by the microcontroller 1 to provide various status indications to the user of the signal generator based on patterns or intensities of the vibrations.

In example embodiments, the local alert subsystem of the signal generator of an example embodiment can include a speaker 13 to emit audible sounds (e.g., buzzing) from the signal generator. The speaker 13 can be used by the microcontroller 1 to provide various status indications to the user of the signal generator based on content, patterns, or intensities of the audible sounds.

By use of the local alert subsystem, the signal generator provides a capability for two way communication between users of the signal generators and their subscribers. As a result, the signal generator can become both a publisher and a subscriber for events in the system. For example, one signal generator can publish an event signal based on the signal generator's sensor subsystem, which can be sent as an event signal to other subscribing signal generators as an LED indication, a haptic motor vibration, and/or a sound emitted from the speaker of the other subscribing signal generator.

Figure 4:
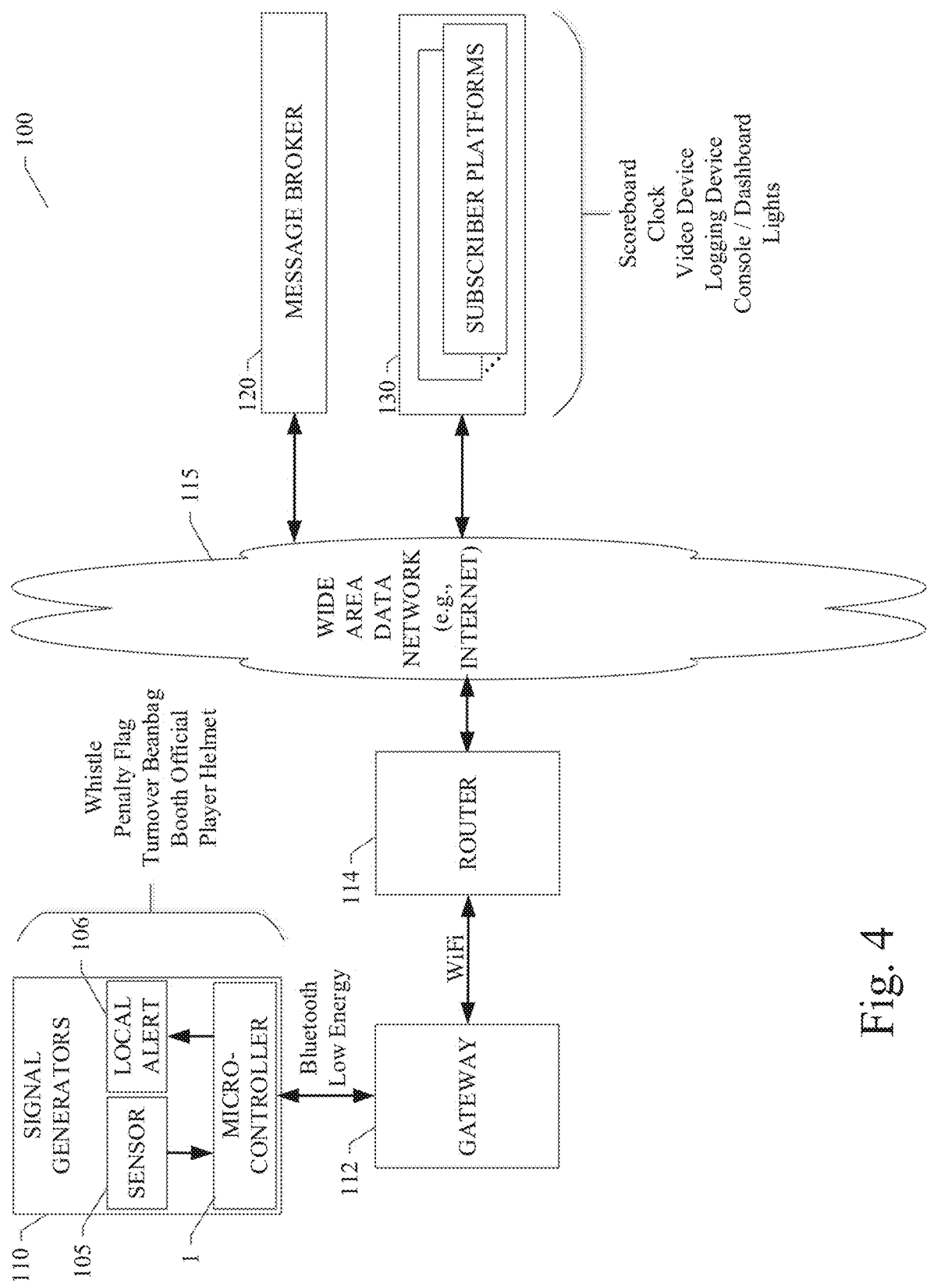
FIG. 4 illustrates an example embodiment of a networked system in which various embodiments may operate.

FIG. 4 illustrates an example embodiment of an event signaling system 100 and a networked system in which various embodiments may operate. Referring to FIG. 4, a signal generator 110 is shown. The signal generator 110 can be configured, as described above, with the several new subsystems including: 1) a microcontroller 1 or data processor, 2) a wireless radio transceiver, 3) a set of sensors 105, and 4) a set of local alert or output devices 106. As described above, the microcontroller 1 can loop analog read and stream data to gateway 112 via the BLE wireless transceiver. Gateway 112 can be a BLE and WiFi-enabled electronic node that can provide a transition between two different types of networks—in this case, a BLE network and a WiFi network. Gateway 112 can provide interoperability between networks and can contain additional subsystems, such as protocol translators, signal translators (e.g., a smart watch), and the like. Standard gateway devices are well-known to those of ordinary skill in the art. In the example embodiment described herein, gateway 112 can be configured to push executable code or firmware to microcontroller 1. This microcontroller 1 resident firmware can manage the sensor subsystem 105 and obtain the various types of sensor information or sensor data as described above. The sensor data can be streamed to gateway 112 via the wireless network interface (e.g., BLE). In a particular example embodiment, the gateway 112 can receive and decode the sensor data to determine if any of the sensors of sensor subsystem 105 have detected a change in status or condition of the signal generator 110. For example, a change in status or condition of the signal generator 110 can be represented by the microphone 2 detecting a sound that exceeds pre-defined volume and duration thresholds (e.g., an official has blown the whistle). For another example, a change in status or condition of the signal generator 110 can be represented by the vibration sensor 3, gyroscope 8, or accelerometer 10 detecting motion of the signal generator 110 in its environment. The gateway 112 can parse the sensor data to determine if any of the sensor thresholds have been exceeded. In an alternative embodiment, the firmware in the signal generator 110 can perform this sensor data processing operation. If a determination is made that the sensor data indicates that one or more sensors of sensor subsystem 105 have reported a change in status or condition of the signal generator 110 based on a sensor threshold having been exceeded, the gateway 112 can trigger the generation and publication of a signal message. As described in more detail below, the signal message representing an event detected at a signal generator 110 is published to subscribers on network-connected subscriber platforms. In this context and in a departure from standard gateway functionality, the gateway 112 can also be considered a signal message publisher. In a particular example embodiment, a publish-subscribe model can be used to transfer data from the gateway 112 to consuming network-connected endpoints. In conventional software architecture, publish-subscribe is a messaging protocol where senders of messages, called publishers, do not program or specify the messages to be sent directly to specific receivers, called subscribers. Instead, the event signaling system 100 categorizes messages for publication into classes or topics without knowledge of which subscribers, if any, may consume the published messages. Similarly, subscribers can express an interest in one or more classes or topics of messages and only receive messages that are categorized into the specified classes or topics of interest, without knowledge of which publishers, if any, originated the messages. In a particular example embodiment, the gateway 112 can use the Message Queuing Telemetry Transport (MQTT) protocol, which is a lightweight, publish-subscribe network protocol that transports messages between devices. The MQTT protocol usually runs over TCP/IP; however, any network protocol that provides ordered, lossless, bi-directional connections can support MQTT. When the gateway 112 triggers the generation and publication of a signal message, the signal message can be passed to router 114 via a WiFi interface or other form of wireless data networking interface.

Router 114 provides data connections between the signal generators 110/gateway 112 and the wide area data network (e.g., Internet) 115. In general, router 114 is a networking device that forwards data packets between computer networks and nodes on the computer networks. The router 114 can be a standard router as well-known to those of ordinary skill in the art. As described in more detail below, the router 114 can transfer the signal messages received from signal generators 110/gateway 112 to a message broker 120 and subscribers on subscriber platforms 130 via network 115.

Network 115 is configured to couple one computing device with another computing device. Network 115 may be enabled to employ any form of computer readable media for communicating information from one electronic device to another. Network 115 can include the Internet, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Network 115 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, hub and spoke networks, peer-to-peer networks, and the like. Network 115 may also include an autonomous system of terminals, gateways, routers, and the like connected by wireless radio links or wireless transceivers. These connectors may be configured to move freely and randomly and organize themselves arbitrarily, such that the topology of network 115 may change rapidly and arbitrarily. In general, network 115 provides bi-directional data communication, sent to and received by network-connected devices connected and authenticated on the network 115. Using various well-known security methods and techniques, secure data communication can be provided across network 115 to prevent false event reporting. The wireless network interfaces of the event signaling system 100 can use various communication protocols, including Bluetooth™ Low Energy (BLE), Zigbee™, Z Wave™, or other well-known wireless data transfer protocols. Client devices connected to network 115 can use network client software that runs on a client computer and allows the client computer to establish connectivity with services running across the network 115.

Network 115 may further employ a plurality of access technologies including 2nd (2G), 2.5, 3rd (3G), 4th (4G), 5th (5G) generation radio access for cellular systems, WLAN, Wireless Router (WR) mesh, and the like. Access technologies such as 2G, 3G, 4G, 5G, and future access networks may enable wide area coverage for mobile devices, such as one or more of client devices 141, with various degrees of mobility. For example, network 115 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 115 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, network 115 may include virtually any wired and/or wireless communication mechanisms by which information may travel between one computing device and another computing device, network, and the like.

Referring still to FIG. 4, the router 114 can transfer the signal messages for publication received from signal generators 110/gateway 112 to a message broker 120 and subscribers on subscriber platforms 130 via network 115. Message broker 120 is a network-connected computing node configured to manage the publish-subscribe protocol for messaging in the example embodiment. Message broker 120 can be configured as a server computer that receives all messages from the message publishing client devices (e.g., the signal generators 110/gateway 112) and then routes the messages for publication to the appropriate destination client devices (e.g., subscriber platforms 130). The message broker 120 can maintain data corresponding to subscriptions to topics received from subscriber platforms 130 via network 115. The message broker 120 can also receive all messages from the message publishing client devices (e.g., the signal generators 110/gateway 112). The message broker 120 can decode the received messages to determine to which topic(s) the messages have been categorized. The message broker 120 can route the messages for publication to the appropriate destination client devices (e.g., subscriber platforms 130) based on the subscriptions previously submitted to the message broker 120 by the subscribers of the message topics. The message broker 120 can be hosted on a server with access to network 115. A message client can be any network-connected device (from the micro controller 1, the subscriber platforms 130, up to a full service server) that runs a messaging library (e.g., an MQTT library) and can connect to the message broker 120 over the network 115. The publish-subscribe protocol implemented by the message broker 120 in an example embodiment can provide several different messaging operations including node connection, node disconnection, and message publication. In the example embodiment, the software implementing the publish-subscribe protocol on the message broker 120 can provide an additional layer of security for secure communication across devices and endpoints to prevent false event reporting. The software implementing the publish-subscribe protocol on the message broker 120 can be modified to support a variety of event reporting messaging across the event signaling system 100 including state change, request for status from other devices, response to another device's request, and the like. Each signal message can include information corresponding to the message topic(s) and a message payload. The message topic(s) is used by message broker 120 to determine to which clients the message should be sent. The message payload can include information relative to an event, a timestamp, an action to be performed, a request, and/or a response to a request. Each signal message can also include information corresponding to a quality of service. For example, the quality of service information and processing can include modes such as: Fire and Forget, Acknowledged, and Assured. The "Fire and Forget" mode causes the publisher to not confirm that the message was received by the subscriber. The message is sent to the network and the publisher can confirm that the message reached the network transport; but, no further transmission/delivery confirmation is sought or provided. The Acknowledged mode obtains acknowledgement from the subscriber platform that the message was delivered. The Assured mode obtains confirmation from the subscriber platform that the message was delivered and read by the subscriber. The different quality of service modes provide varying levels of message transmission and delivery confirmation, as needed for support of different events or devices.

The message broker 120 and subscriber platforms 130 may include any of a variety of consumers or providers of network transportable digital data, such as network-connected client or server computing platforms. The network transportable digital data can be transported in any of a family of data or file formats and associated mechanisms to enable a message broker 120 and a subscriber platform 130 to receive signal messages from a signal generator 110 and to enable the message broker 120 and the subscriber platform 130 to send messages and local alert data to a signal generator 110 over the network 115. In one embodiment, the file format can be a standard text format, a messaging format, an email format, a voice file format, a CSV (Comma Separated Values) format, or the like; however, the various embodiments are not so limited, and other data or file formats and transport protocols may be used. For example, data formats other than text, chat, voice, or CSV or formats other than open/standard formats can be supported by various embodiments. Any electronic data or file format, such as conventional database formats, Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, a message broker 120 and a subscriber platform 130 may provide a variety of different data sets or computational modules.

In an example embodiment, the subscriber platforms 130 with one or more client devices enable a user to access signal message data provided by the event signaling system 100 via the network 115. Client devices of subscriber platforms 130 may include virtually any computing device that is configured to send and receive information over a network, such as network 115. Such client devices may include portable devices, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, Internet of Things (IoT) devices, integrated devices combining one or more of the preceding devices, and the like. The client devices may also include other computing devices, such as personal computers, multiprocessor systems, microprocessor-based or programmable consumer electronics, network PCs, and the like. The client devices may also include other processing devices, such as consumer electronic (CE) devices and/or mobile computing devices, which are known to those of ordinary skill in the art. As such, the client devices of subscriber platforms 130 may range widely in terms of capabilities and features. Moreover, a web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

By use of the event signaling system 100 and the networked system as described above, various embodiments may support a variety of different types of signal generators 110 and subscriber platforms 130. For example, as shown in FIG. 4, the different types of signal generators 110 can include a smart whistle, penalty flag, turnover beanbag, booth official device, and player-worn devices, such as helmets. These various forms of the signal generator 110 are described in detail below. Additionally, as also shown in FIG. 4, the different types of subscriber platforms 130 can include subscriber devices, such as a scoreboard, game clock, video display or recording devices, event logging devices, console or dashboard control devices, light arrays, and the like. The different types of subscriber platforms 130 can also include subscriber platforms operated by human users, such as game officials, team representatives, sports fans, media representatives, and the like. As with any networked system, the subscriber devices or subscriber users can be locally present or located anywhere in the world with network connectivity. These various forms of the subscriber platforms 130 are also described in detail below.

Figure 5:
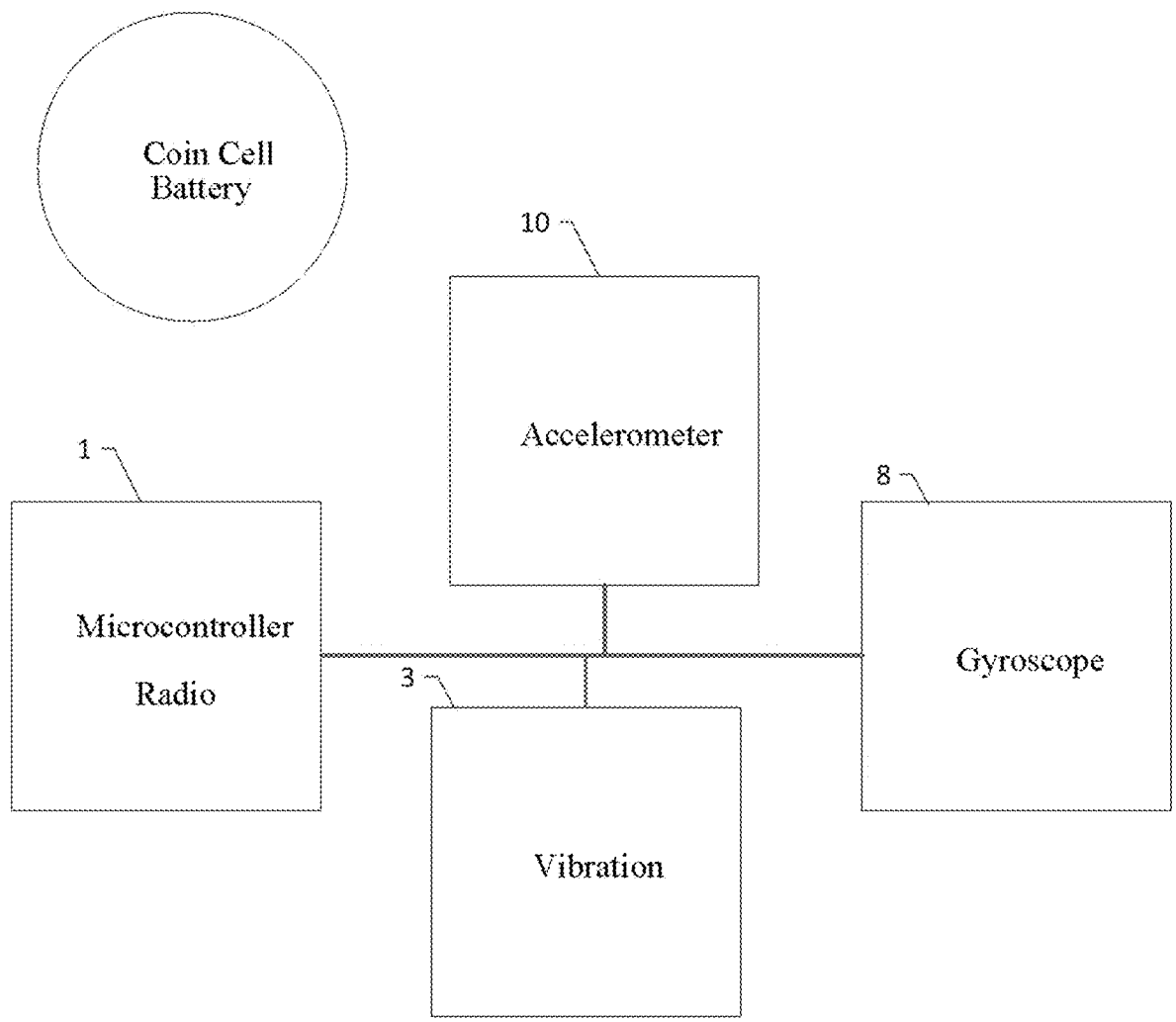
FIG. 5 illustrates a schematic of an example embodiment of the devices or subsystems provided in a penalty flag or signal generator, which may be used in the event signaling system as described herein.

Referring now to FIGS. 5 through 8, example embodiments illustrate the different types of devices or subsystems that may be provided in a signal generator, which may be used in or with the event signaling system as described herein. FIG. 5 illustrates a schematic of an example embodiment of the devices or subsystems provided in, on, or attached to a penalty flag or signal generator, which may be used in or with the event signaling system as described herein. For example, in the game of American football, an official can throw a penalty flag to indicate an infraction by a game player or coaching staff. In an example embodiment, the penalty flag can be modified or augmented to include elements of the signal generator 110 as described above, the elements including the microcontroller/radio 1, an accelerometer 10, a vibration sensor 3, and a gyroscope 8. As will be understood by those of ordinary skill in the art in view of the disclosure herein, a different combination of sensors can also be provided in the penalty flag in the example embodiment. The sensors can be powered by a battery, such as a coin-cell battery. The sensors resident with the penalty flag enable the event signaling system 100 to detect when, where, and in what direction the penalty flag is thrown by the official and thereby detect the event signal from the official. The microcontroller/radio 1 can obtain this event signal information from the sensors resident with the penalty flag and convey the signal information to the subscriber platforms 130 via gateway 112, router 114, and network 115 as described above.

Figure 6:
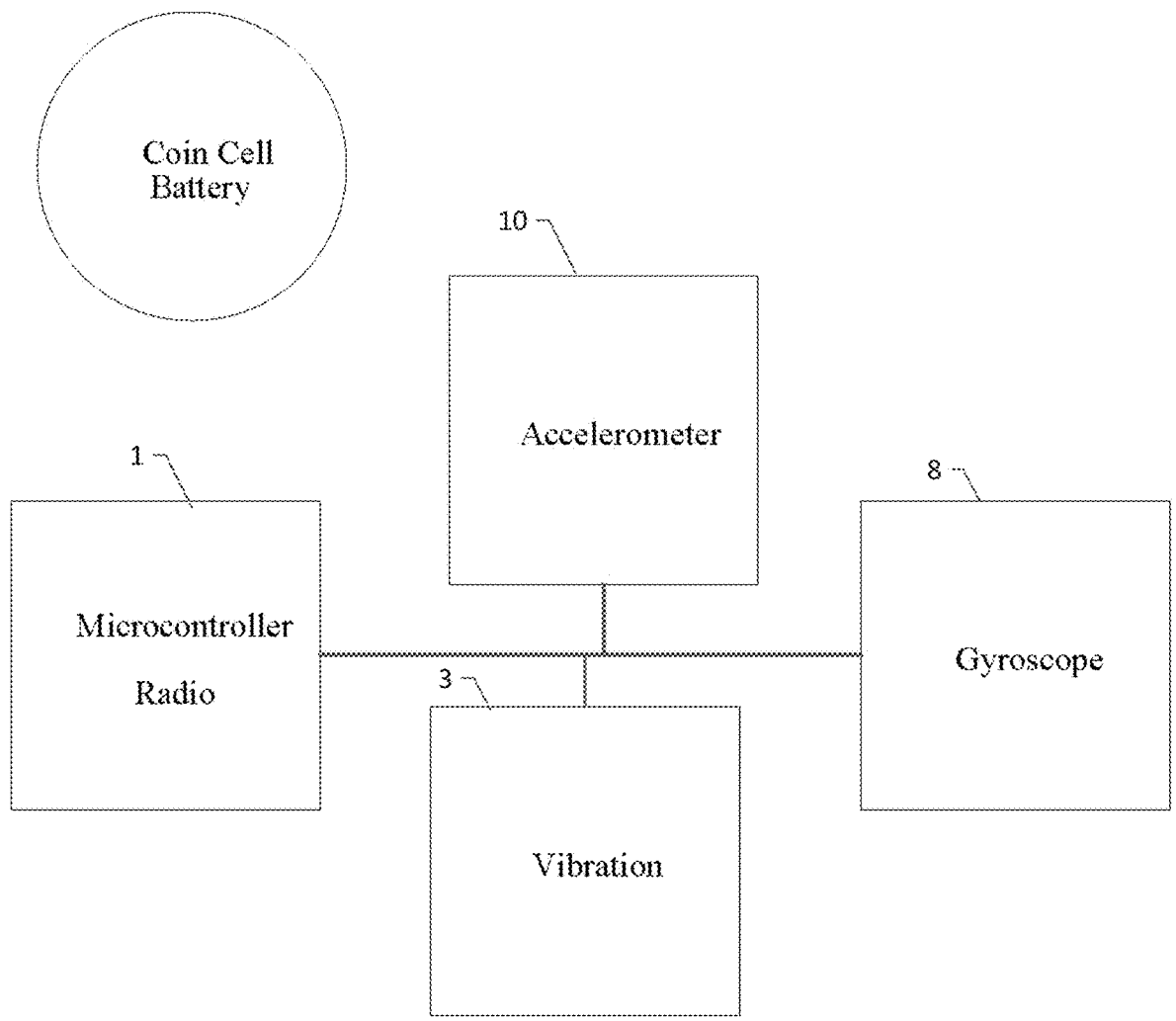
FIG. 6 illustrates a schematic of an example embodiment of the devices or subsystems provided in a turnover beanbag or signal generator, which may be used in the event signaling system as described herein.

FIG. 6 illustrates a schematic of an example embodiment of the devices or subsystems provided in, on, or attached to a turnover beanbag or signal generator, which may be used in or with the event signaling system as described herein. For example, in the game of American football, an official can throw a turnover beanbag to indicate a change in possession or control of the ball. In an example embodiment, the turnover beanbag can be modified or augmented to include elements of the signal generator 110 as described above, the elements including the microcontroller/radio 1, an accelerometer 10, a vibration sensor 3, and a gyroscope 8. As will be understood by those of ordinary skill in the art in view of the disclosure herein, a different combination of sensors can also be provided in the turnover beanbag in the example embodiment. The sensors can be powered by a battery, such as a coin-cell battery. The sensors resident with the turnover beanbag enable the event signaling system 100 to detect when, where, and in what direction the turnover beanbag is thrown by the official and thereby detect the event signal from the official. The microcontroller/radio 1 can obtain this event signal information from the sensors resident with the turnover beanbag and convey the signal information to the subscriber platforms 130 via gateway 112, router 114, and network 115 as described above.

Figure 7:
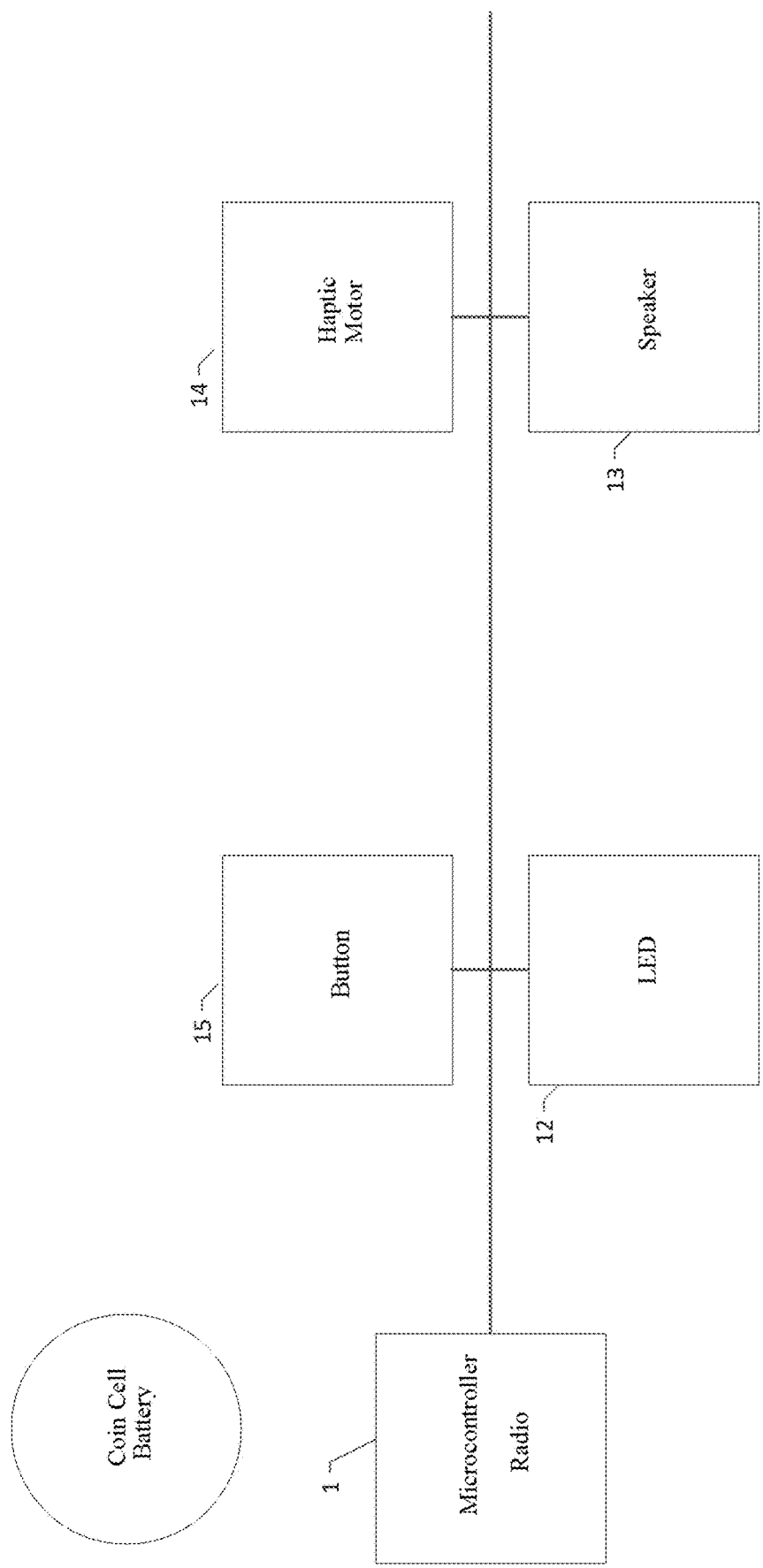
FIG. 7 illustrates a schematic of an example embodiment of the devices or subsystems provided in a booth official device or signal generator, which may be used in the event signaling system as described herein.

FIG. 7 illustrates a schematic of an example embodiment of the devices or subsystems provided in a booth official device or signal generator, which may be used in or with the event signaling system as described herein. For example, in many types of sporting events, one or more event officials can be positioned in a location other than on the field or surface of play. Many sports will place one or more officials in a press box, video room, or other remote location (e.g., booth officials) to monitor the sports activity from an alternate location in the venue. As part of monitoring the sports activity, it is important for booth officials to be in direct and immediate communication with the officials on the field or surface of play (e.g., the game officials). It is also important for the game officials on the field or surface of play to be in direct and immediate communication with the booth officials. To support this communication between the game officials and the booth officials, an example embodiment can provide a signal generator configured for a booth official. In an example embodiment, the booth official signal generator can be configured to include local alert elements and/or sensors of the signal generator 110 as described above, the local alert elements and/or sensors including the microcontroller/radio 1, a physical button 15, an LED display 12, a haptic motor 14 to cause a vibration, and a speaker 13. As will be understood by those of ordinary skill in the art in view of the disclosure herein, a different combination of local alert elements and/or sensors can also be provided in the booth official signal generator in the example embodiment. The local alert elements and/or sensors can be powered by a battery, such as a coin-cell battery. The local alert elements resident with the booth official signal generator enable the booth official to use the button 15 to send a local alert signal to subscriber platforms and other signal generators via the event signaling system 100. The local alert elements resident with the booth official signal generator also enable the booth official to receive signal information (via the LEDs 12, haptic motor vibration 14, or speaker 13) from other signal generators via the event signaling system 100. The microcontroller/radio 1 in the booth official signal generator can obtain this local alert information from the sensors resident with the other signal generators as conveyed to the booth official signal generator and the subscriber platforms 130 via gateway 112, router 114, and network 115 as described above.

In other embodiments, the equipment and signal generators used by officials of a sporting activity can include additional microcontrollers to manage inputs/outputs from additional sensors and the network 115. For example, a Smart Watch device can be used to act as a gateway between the signal generator microcontroller and the network to publish/subscribe to events. A Smart watch application (app) can display messages, vibrate, or play sounds as a local alert to an official. In another embodiment, the penalty flag signal generator can be configured to include a fall sensor to detect when the penalty flag is thrown, and to send a signal message to the smart watch or gateway to indicate that the penalty flag has been thrown. In another embodiment, the turnover beanbag signal generator can be configured to include a fall sensor to detect when turnover beanbag is thrown (indicating a turnover event), and to send a signal message to the smart watch or gateway to indicate that the turnover flag has been thrown. In another embodiment, the booth official signal generator, often near a TV broadcast booth, can be configured with a local alert device or sensor providing a button, light, or speaker, and to send/receive messaging to/from a booth official.

Figure 8:
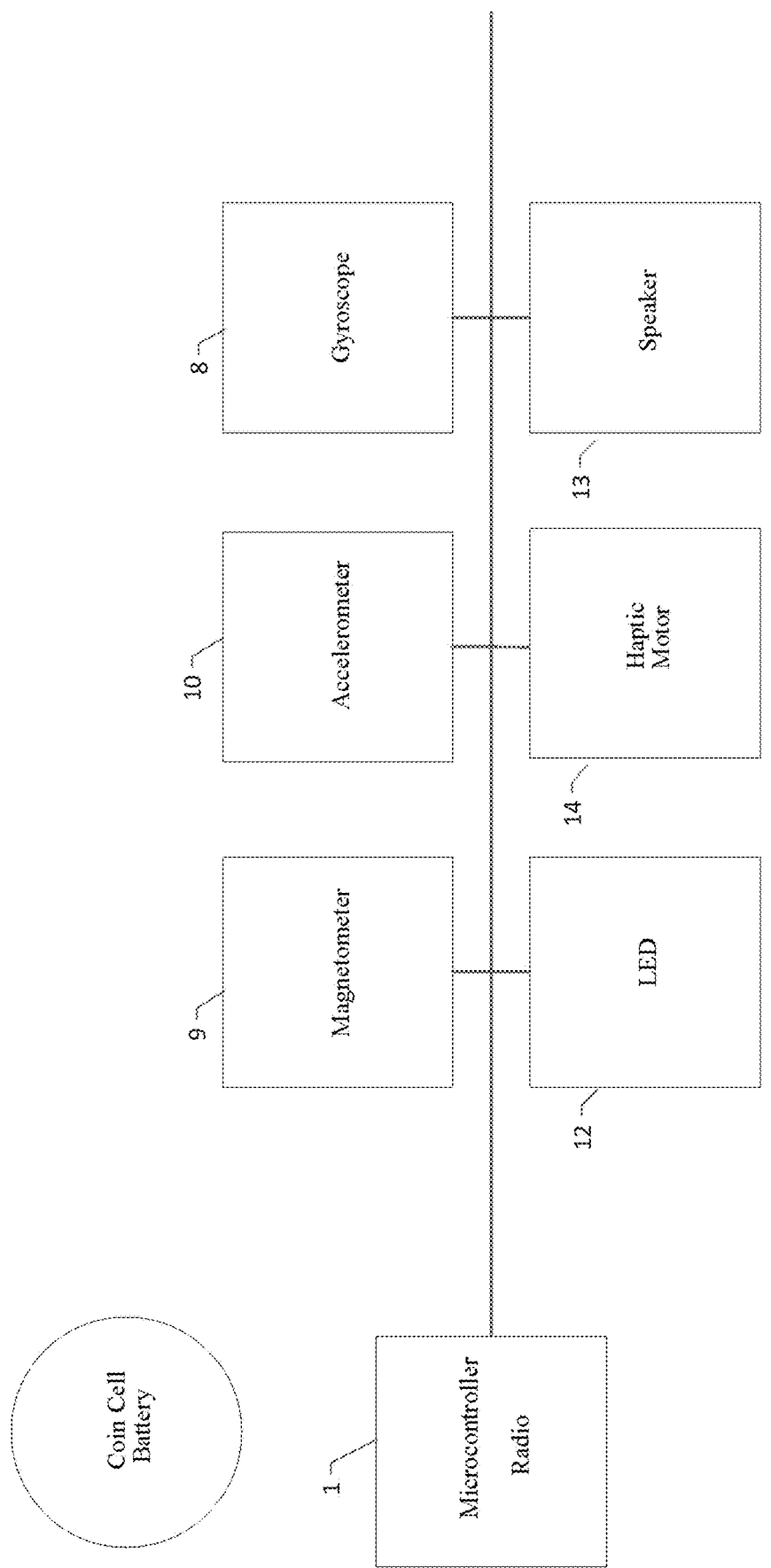
FIG. 8 illustrates a schematic of an example embodiment of the devices or subsystems provided in a player helmet device or signal generator, which may be used in the event signaling system as described herein.

FIG. 8 illustrates a schematic of an example embodiment of the devices or subsystems provided in, on, or attached to a player helmet device or signal generator, which may be used in or with the event signaling system as described herein. For example, in some types of sporting events, it can be beneficial for one or more players or coaches to be outfitted with a signal generator as disclosed herein. It is important for players and coaches to be in direct and immediate communication with each during the sporting activity. To support this communication between players and coaches, an example embodiment can provide a signal generator configured as a wearable device for players and coaches. In an example embodiment, the player signal generator can be configured as a player helmet including local alert elements and/or sensors of the signal generator 110 as described above, the local alert elements and/or sensors including the microcontroller/radio 1, a magnetometer 9, an LED display 12, a haptic motor 14 to cause a vibration, a speaker 13, an accelerometer 10, and a gyroscope 8. As will be understood by those of ordinary skill in the art in view of the disclosure herein, a different combination of local alert elements and/or sensors can also be provided in the player signal generator in the example embodiment. The local alert elements and/or sensors can be powered by a battery, such as a coin-cell battery. The local alert elements resident with the player signal generator enable the player or coach to receive signal information (via the LEDs 12, haptic motor vibration 14, or speaker 13) from other signal generators via the event signaling system 100. The microcontroller/radio 1 in the player signal generator can obtain this local alert information from the sensors resident with the other signal generators as conveyed to the player signal generator and the subscriber platforms 130 via gateway 112, router 114, and network 115 as described above. Additionally, the sensors resident with the player signal generator enable the event signaling system 100 to detect when, where, and in what direction the player has moved and thereby detect an event signal from the player. The microcontroller/radio 1 can obtain this event signal information from the sensors resident with the player signal generator and convey the signal information to the subscriber platforms 130 via gateway 112, router 114, and network 115 as described above.

In another example embodiments, player equipment may be outfitted with a microcontroller and paired with various sensors to signal different events across system. The microcontroller can manage inputs/outputs from sensors and the network, and provide two-way communication between player equipment and network devices. The sensors/devices configured on or with the player equipment can include lights, haptic motors, a speaker/buzzer, or other device that activates when a subscribed event occurs, when published events/information changes state, or when a sensor is triggered. Player helmets may be configured to include lights that display, a speaker/buzzer that sounds, or a haptic motor that vibrates when whistle is blown or other event occurs.

In a particular example embodiment, the physical locations of signal generators 110 can be determined using trilateration. When three devices with fixed locations are used together, time of flight calculations can be used to determine location of a signal generator 110, such as a whistle, using trilateration. True-range multilateration is a method to determine the location of a movable vehicle or stationary point in space using multiple ranges (distances) between the vehicle/point and multiple spatially-separated known locations (often termed 'stations').

Figure 9:
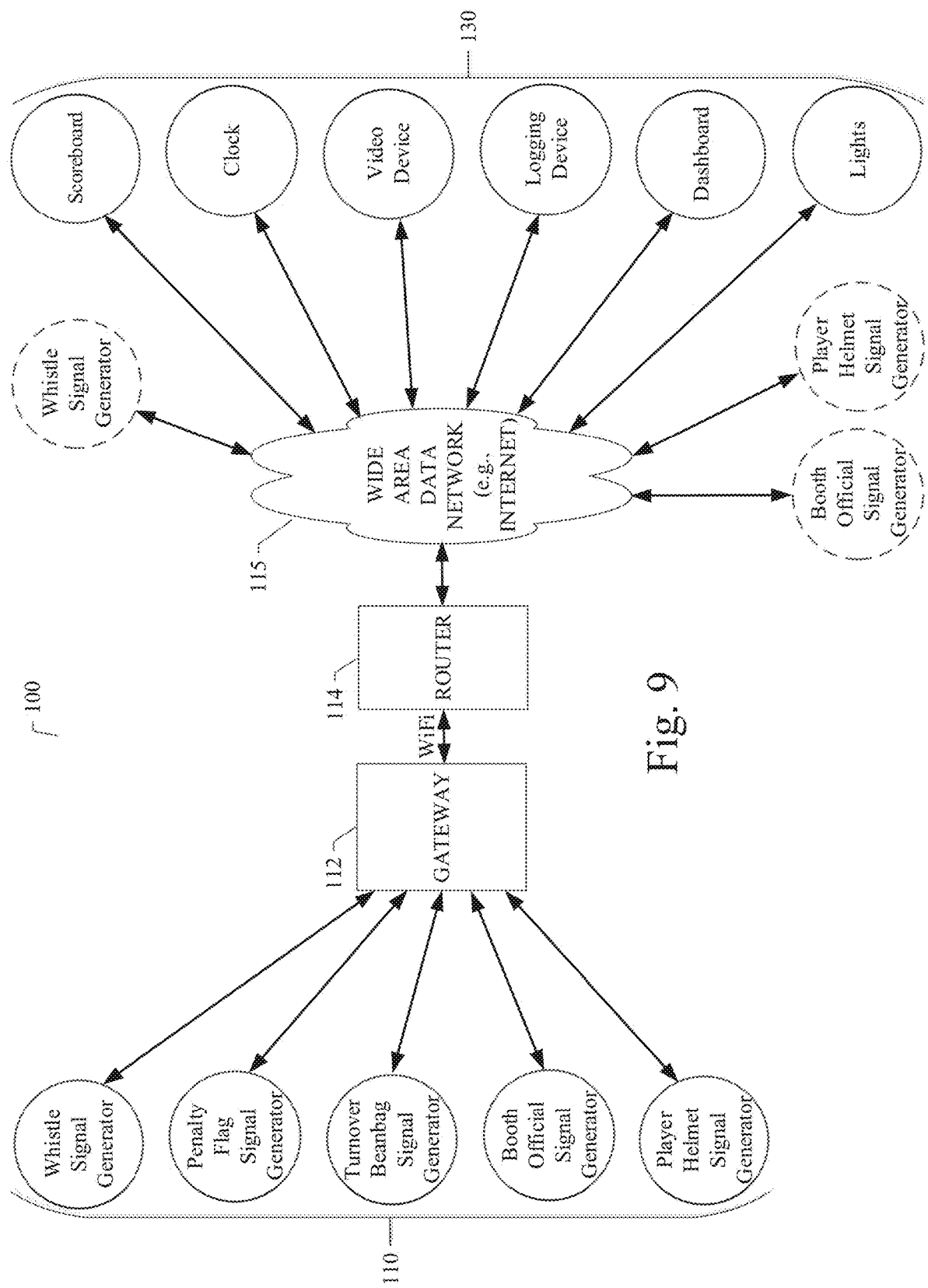
FIG. 9 illustrates an example embodiment of the event signaling system providing network connectivity between a variety of different signal generators and a variety of different subscribers.

FIG. 9 illustrates an example embodiment of the event signaling system 100 providing network connectivity between a variety of different signal generators 110 and a variety of different subscriber platforms 130. The event signaling system 100 as described herein for various example embodiments may support a variety of different types of signal generators 110 and subscriber platforms 130. For example, as shown in FIG. 9, the different types of signal generators 110 can include a smart whistle, penalty flag, turnover beanbag, booth official device, and player-worn devices, such as helmets. These various forms of the signal generators 110 are described in detail above. It will be apparent to those of ordinary skill in the art in view of the disclosure herein that other equivalent types and configurations of signal generators 110 can be similarly assembled and used by virtue of the teachings herein.

Referring still to FIG. 9, different types of subscriber platforms 130 can be supported by the event signaling system 100 of an example embodiment. The supported subscriber platforms 130 can include subscriber devices, such as a scoreboard, game clock, video display or recording devices, event logging devices, console or dashboard control devices, light arrays, and the like. The different types of subscriber platforms 130 can also include subscriber platforms operated by human users, such as game officials, team representatives, sports fans, media representatives, and the like. As with any networked system, the subscriber devices or subscriber users can be locally present or located anywhere in the world with network connectivity.

The subscriber devices of subscriber platforms 130 may include video display or recording devices or video signal processors. These video devices are one of many nodes on network 115 that may subscribe to topics of interest. The processors of the video devices can receive signal messages from the signal generators 110 and take appropriate action based on the received content. For example, the video devices can use the content from a signal message to insert or overlay a graphic onto video content, wherein the graphic includes information corresponding to information retrieved from a signal message topic or message payload. The video content combined with the signal message graphic can displayed on screen or rendered in a digital recording using augmented reality (AR) techniques. The video signal processors allow for flexible location placement of graphics or overlays on the display screen. The video devices can provide rapid processing of the signal message content so video content combined with the signal message graphic can displayed on screen for live broadcasts including instant replay.

The subscriber devices of subscriber platforms 130 may also include scoreboard displays or game play clocks. The scoreboard and game clock devices are one of many nodes on network 115 that may subscribe to topics of interest. The processors of the scoreboard and game clock can receive signal messages from the signal generators 110 and take appropriate action (e.g., show a message, flash a light, sound a buzzer, etc.) based on the received signal message content. For example, the scoreboard and game clock can use the content from a signal message to modify the scoreboard or game clock based on information retrieved from a signal message topic or message payload. The modified scoreboard or game clock information can be used to generate a graphic displayed on a video screen or rendered in a digital recording using augmented reality (AR) techniques.

The subscriber devices of subscriber platforms 130 may also include a game data logging device. The logging devices are one of many nodes on network 115 that may subscribe to topics of interest. The processors of the logging devices can receive signal messages from the signal generators 110 and log or store in a memory device data received in the signal message content. The logging devices can log information related to events that have occurred within the event signaling system 100. Events can be logged by the event signaling system 100 and written to data files or databases for future review. The logged information can include errors and warnings as well as informational events.

The subscriber devices of subscriber platforms 130 may also include a console or dashboard display device. The console or dashboard display device is one of many nodes on network 115 that may subscribe to topics of interest. The processors of the console or dashboard display device can receive signal messages from the signal generators 110 and take appropriate action based on the received signal message content. The console or dashboard provides at-a-glance views of devices across the network 115/114/112/110 to ensure all components are functioning properly. The console may send requests to various nodes in the event signaling system 100 to inquire regarding status, temperature, battery charge level, reset device, etc.

As shown in FIG. 9, the subscriber devices of subscriber platforms 130 may also include signal generators 110. For example, as shown in FIG. 9, the whistle signal generator, the booth official signal generator, and the player helmet signal generator (shown in dashed circles), as well as other signal generators, can be both signal generation devices and subscriber devices. The signal generators 110 configured with local alert devices 106 can use the message broker 120 to subscribe to topics of interest, just like any other subscriber of subscriber platforms 130. As a result, a signal generator 110 operating as a subscriber can receive a signal message from another signal generator 110. The local alert devices 106 of the receiving/subscribing signal generator 110 can be used to communicate the alert signal of the signal message to the operator or user of the receiving/subscribing signal generator 110. In this manner, for example, the detection of a penalty flag being thrown by an official can be automatically communicated from the penalty flag signal generator to the subscribing signal generator in a player helmet. Similarly, the activation of a button on a booth official signal generator can be automatically communicated to the subscribing signal generator in an official's whistle signal generator.

Figure 10:
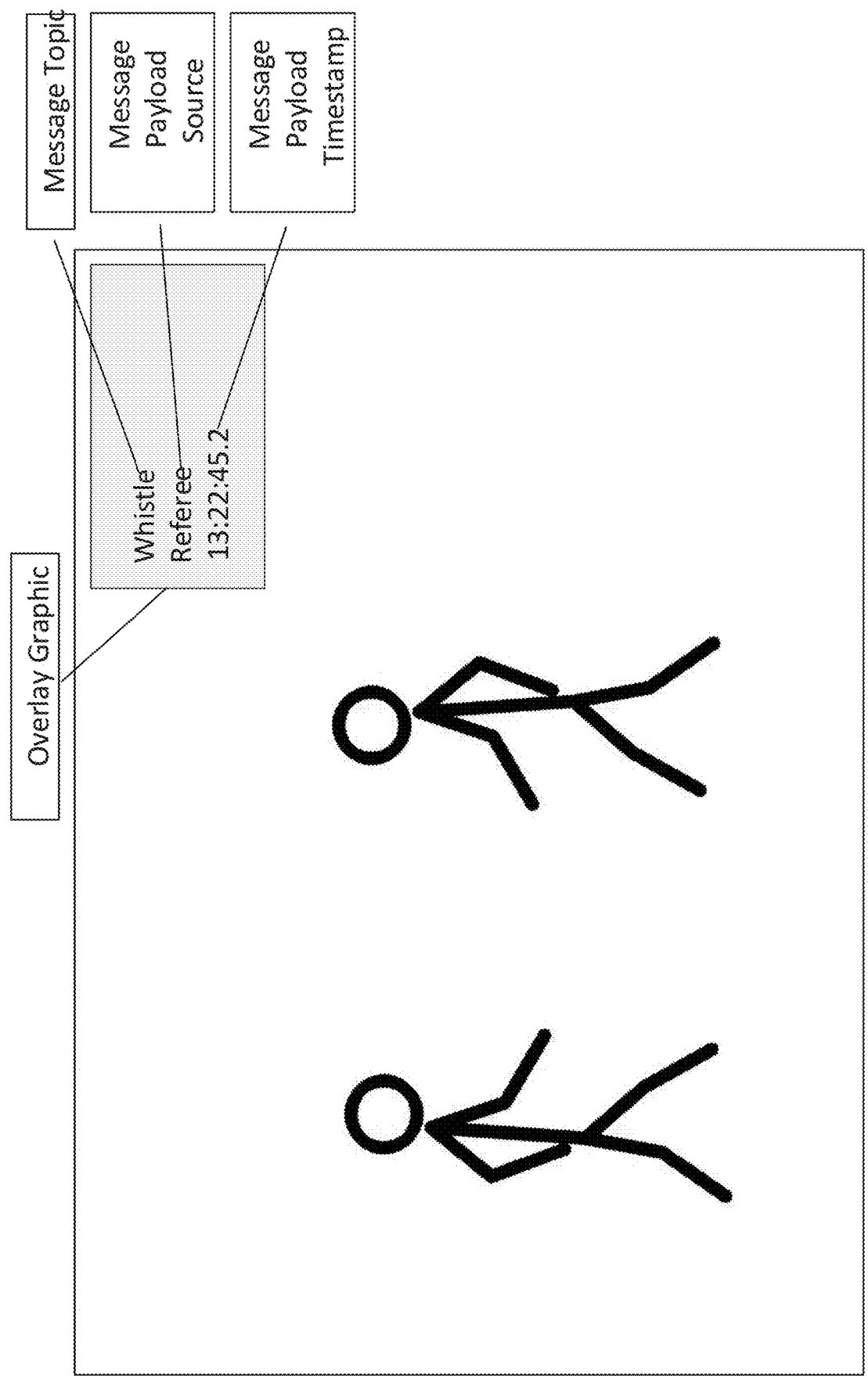
FIG. 10 illustrates an example embodiment of a video overlay graphic that can be produced using the alert signal information generated by a signal generator and communicated to a subscribing video device as a signal message via the network of the event signaling system disclosed herein.

FIG. 10 illustrates an example embodiment of a video overlay graphic that can be produced using the alert signal information generated by a signal generator 110 and communicated to a subscribing video device 130 as a signal message via the network of the event signaling system 100 as described herein. In the example shown in FIG. 10, a whistle signal generator 110 has detected a whistle being blown by an official. As a result of this event detection, the whistle signal generator 110 produced a signal message related to the detected event. The signal message can include the type or topic of detected event (e.g., whistle blown), the time the event was detected (e.g., timestamp), an identifier of the signal generator or user that originated the event detection (e.g., referee), and other information related to the particular detected event. This event information can be generated and stored as a payload data block in the signal message. As described above, the signal message can be communicated to subscribers of subscriber platforms 130 via the event signaling system 100 as described herein. In the example of FIG. 10, a subscriber platform 130 can include a video generation or recording device, such as a video system used by a sports broadcast network. A data processor of the subscribing video generation or recording device 130 can receive the signal message communicated by the whistle signal generator 110 via the event signaling system 100. The data processor of the subscribing video generation or recording device 130 can deconstruct the signal message and retrieve the message payload. As a result, the data processor of the subscribing video generation or recording device 130 can obtain the data related to the event detected by the signal generator 110. In the example of FIG. 10, the data related to the detected event can include the type or topic of detected event (e.g., whistle blown), the time the event was detected (e.g., timestamp), an identifier of the signal generator or user that originated the event detection (e.g., referee), and other information related to the particular detected event. This data related to the detected event can be used to generate a video overlay graphic that can be layered onto a video display frame. General techniques for layering graphic overlays on a video frame are well-known to those of ordinary skill in the art. Thus, as a result of the operation of the event signaling system 100 described herein, event detections from signal generators 110 can be immediately and automatically conveyed to subscriber platforms 130 and rendered to inform subscribers of the event detection.

Figure 11:
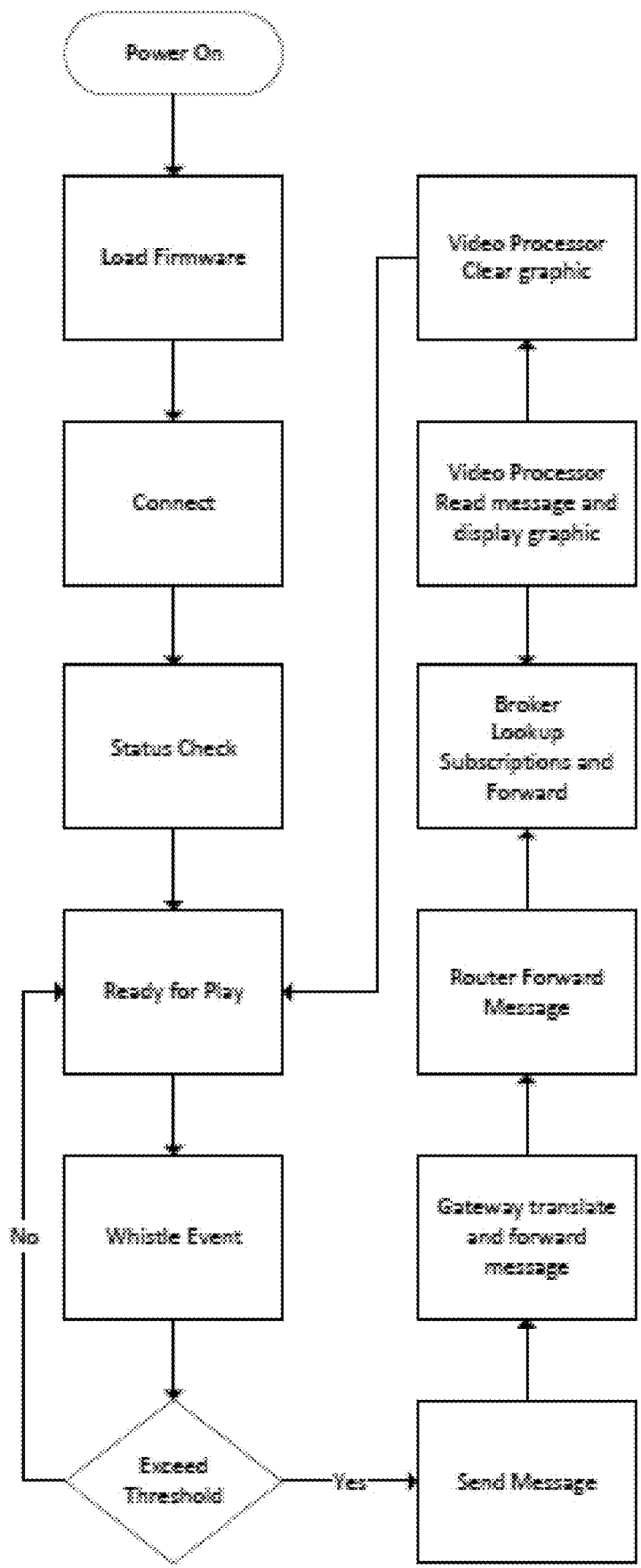
FIG. 11 illustrates an operational flow diagram that shows an example embodiment of a workflow as described herein.

FIG. 11 illustrates an operational flow diagram that shows an example embodiment of a workflow as described herein. Referring now to FIG. 11, an example embodiment of the workflow used in the event signaling system 100 can include among the following operational steps:

1. A signal generator, such as a whistle, powers on.
2. Firmware is loaded into the signal generator and begins execution.
3. The signal generator connects to the gateway and/or router.
4. The signal generator completes a status check and integrates with the event signaling system.
5. Upon successful status check completion, the event signaling system is ready for operational play.
6. The signal generator receives a signal indication (e.g., an Official blows a whistle).
7. The microcontroller in the signal generator determines if the sound from the whistle exceeds a threshold.

8. If the sound from the whistle exceeds the threshold (Yes), the signal generator prepares a signal message with information related to the detected event and sends the signal message with the event information to the gateway.
9. If the sound from the whistle does not exceed the threshold (No), the signal generator resumes and is made ready for play.
10. The gateway receives a signal message from a signal generator and translates protocol as needed. The gateway forwards the signal message to the router.
11. The router forwards the signal message to the network.
12. The broker receives the signal message via the network, decodes the signal message to determine a topic(s) corresponding to the signal message, performs a lookup to determine subscribers who have subscribed to the topic(s) corresponding to the received signal message, and forwards the signal message to the subscribed subscribers via the network.
13. A subscribed subscriber (e.g., a video processor) receives the signal message via the network, creates graphics corresponding to the content in the received signal message, and displays the graphics on a video screen or records the graphics on a digital recording device.
14. After displaying the graphic for a pre-configured period of time (e.g., five seconds), the video processor can clear the graphic.
15. The event signaling system is reset and made ready for play and receipt of a next signal message corresponding to a next game event.

Referring now to FIG. 12, a processing flow diagram illustrates an example embodiment of a method implemented by the event signaling system 100 as described herein. The method 2000 of an example embodiment includes: detecting an event at a sporting activity by use of a signal generator with a data processor and a sensor subsystem, the event detection being triggered by a sensor of the sensor subsystem detecting a signal exceeding a pre-defined threshold (processing block 2010); generating a signal message including information indicative of the event detection (processing block 2020); establishing, by use of the data processor of the signal generator, a connection with a data network (processing block 2030); sending the signal message to a message broker via the data network (processing block 2040); and causing the message broker to forward the signal message to subscribed subscriber platforms (processing block 2050).

In various example embodiments described herein, a system and method for providing network-enabled signaling devices for sporting events are disclosed. In the various example embodiments described herein, a computer-implemented tool or software application (app) as part of an event signaling system is described to automate and improve the ability for sports officials, players, and coaches to efficiently connect and engage with each other in a sports activity. In various example embodiments described herein, the event signaling system provides a series of devices and processes to facilitate detection and communication of event signals of a sports activity to a plurality of network-connected subscribers. As a result, the described embodiments improve the fields of data communication, network connectivity, network-based event detection and publication, and an improved ability for sports officials, players, and coaches to efficiently connect, engage, and communicate with each other in a sports activity.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    detecting at least one event of a plurality of different types of sporting official events produced by a sporting official at a sporting activity by use of a signal generator with a data processor and a sensor subsystem, the at least one sporting official event detection of the plurality of different types of sporting official events being triggered by one or more sensors of the sensor subsystem detecting a signal exceeding a pre-defined threshold;
    generating a signal message including information indicative of the at least one sporting official event detection corresponding to the at least one event produced by the sporting official using the signal generator, the signal message including information indicative of at least one of the plurality of different types of sporting official events and a location from which the sporting official event originated;
    categorizing the signal message into one or more subscriber topics associated with the at least one sporting official event detection, wherein each of the one or more subscriber topics corresponds to a different sporting official event of the plurality of different types of sporting official events;
    establishing, by use of the data processor of the signal generator, a connection with a data network;
    sending the signal message to a message broker via the data network; and
    causing the message broker to forward the signal message to subscribed subscriber platforms, wherein only subscriber platforms that have subscribed to the one or more subscriber topics into which the signal message has been categorized receive the forwarded signal message.

2. The method of claim 1 wherein the signal generator is of a type from the group consisting of: a smart whistle, a penalty flag, a turnover beanbag, a booth official device, and a player-worn device.

3. The method of claim 1 wherein the sensor subsystem includes one or more sensors of a type from the group consisting of: a microphone, a vibration sensor, a pressure sensor, a temperature sensor, a humidity sensor, a barometric pressure sensor, a gyroscope, a magnetometer, an accelerometer, and a photoresistor.

4. The method of claim 1 wherein the subscriber platforms are of a type from the group consisting of: a scoreboard, a game clock, a video display or recording device, an event logging device, a console or dashboard control device, and a light array.

5. The method of claim 1 wherein the sporting official event detection corresponds to the blowing of a whistle by the sporting official.

6. The method of claim 1 wherein the signal generator further includes a local alert subsystem having one or more local alert output devices configured to alert the sporting official using the signal generator.

7. The method of claim 6 wherein the local alert subsystem includes one or more devices of a type from the group consisting of: light-emitting diodes (LEDs), a haptic motor to cause physical vibration of the signal generator, and a speaker to emit audible sounds.

8. The method of claim 1 wherein the signal generator further includes a manual button with which the sporting official can manually signal the occurrence of an event by manually pressing the button.

9. The method of claim 1 wherein the connection with a data network includes a Bluetooth™ Low Energy (BLE) wireless data connection.

10. The method of claim 1 wherein establishing a connection with a data network further includes establishing a connection with a gateway.

11. The method of claim 1 wherein the message broker is configured to maintain subscription data corresponding to topics subscribed to by the subscriber platforms.

12. The method of claim 1 wherein the signal message includes information corresponding to a timestamp, an action to be performed, a request, or a response to a request, including categorizing the signal message into one or more subscriber topics.

13. The method of claim 1 including determining which of the one or more subscriber topics into which the signal message has been categorized.

14. The method of claim 1 wherein the signal message includes information corresponding to a quality of service.

15. The method of claim 1 including determining a physical location of the signal generator using trilateration.

16. A system comprising:
a data network;
a message broker in data communication on the data network;
a subscriber platform in data communication on the data network; and
a signal generator including a data processor and a network interface, in data communication with the data processor, for communication on the data network, the signal generator including a sensor subsystem, the signal generator configured to:
detect at least one event of a plurality of different types of sporting official events produced by a sporting official at a sporting activity by use of a signal generator with a data processor and a sensor subsystem, the at least one sporting official event detection of the plurality of different types of sporting official events being triggered by one or more sensors of the sensor subsystem detecting a signal exceeding a pre-defined threshold;
generate a signal message including information indicative of the at least one sporting official event detection corresponding to the at least one event produced by the sporting official using the signal generator, the signal message including information indicative of at least one of the plurality of different types of sporting official events and a location from which the sporting official event originated;
categorize the signal message into one or more subscriber topics associated with the at least one sporting official event detection, wherein each of the one or more subscriber topics corresponds to a different sporting official event of the plurality of different types of sporting official events;
establish, by use of the data processor, a connection with the data network via the network interface;
send the signal message to the message broker via the data network; and
cause the message broker to forward the signal message to the subscriber platform, wherein only subscriber platforms that have subscribed to the one or more subscriber topics into which the signal message has been categorized receive the forwarded signal message.

17. The system of claim 16 wherein the signal generator is of a type from the group consisting of: a smart whistle, a penalty flag, a turnover beanbag, a booth official device, and a player-worn device.

18. The system of claim 16 wherein the sensor subsystem includes one or more sensors of a type from the group consisting of: a microphone, a vibration sensor, a pressure sensor, a temperature sensor, a humidity sensor, a barometric pressure sensor, a gyroscope, a magnetometer, an accelerometer, and a photoresistor.

19. The system of claim 16 wherein the subscriber platform is of a type from the group consisting of: a scoreboard, a game clock, a video display or recording device, an event logging device, a console or dashboard control device, and a light array.

20. The system of claim 16 wherein the signal generator further includes a local alert subsystem having one or more local alert output devices configured to alert the sporting official using the signal generator.

* * * * *